US011243139B2

(12) United States Patent
Meschenmoser et al.

(10) Patent No.: US 11,243,139 B2
(45) Date of Patent: Feb. 8, 2022

(54) DEVICE AND METHOD FOR OPTICAL MEASUREMENT OF AN INTERNAL CONTOUR OF A SPECTACLE FRAME

(71) Applicant: Carl Zeiss Vision International GmbH, Aalen (DE)

(72) Inventors: Ralf Meschenmoser, Essingen (DE); Friedrich Pauker, Diedorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/336,775

(22) Filed: Jun. 2, 2021

(65) Prior Publication Data

US 2021/0285845 A1 Sep. 16, 2021

Related U.S. Application Data

(63) Continuation of application No. PCT/EP2019/086338, filed on Dec. 19, 2019.

(30) Foreign Application Priority Data

Dec. 19, 2018 (DE) .......................... 102018222231.2

(51) Int. Cl.
*G01B 9/00* (2006.01)
*G01M 11/02* (2006.01)
(Continued)

(52) U.S. Cl.
CPC .... *G01M 11/0235* (2013.01); *G01M 11/0214* (2013.01); *G02C 1/10* (2013.01); *G02C 7/02* (2013.01)

(58) Field of Classification Search
CPC .............. G03F 7/706; G01M 11/0235; G01M 11/0264; G01M 11/0214; G01M 11/0228
(Continued)

(56) References Cited

U.S. PATENT DOCUMENTS

| 5,307,150 A | 4/1994 | Lecerf et al. |
| 6,122,063 A | 9/2000 | Berndt et al. |

(Continued)

FOREIGN PATENT DOCUMENTS

| DE | 9317381 U1 | 1/1994 |
| DE | 4224640 C2 | 8/1995 |

(Continued)

OTHER PUBLICATIONS

International Preliminary Report on Patentability issued in PCT/EP2019/086338, to which this application claims priority, completed Mar. 16, 2021, and English-language translation thereof.

(Continued)

*Primary Examiner* — Md M Rahman
(74) *Attorney, Agent, or Firm* — Thrive IP®; Georg Hasselmann

(57) ABSTRACT

An apparatus and a method for optical measurement of an internal contour of a spectacle frame are disclosed. The apparatus contains an optical unit, which is configured to capture light reflected from an illuminated section of the inner contour of the spectacle frame. The optical unit is insertable into the inner contour of the spectacle frame and, when inserted as intended, is rotatable relative to the spectacle frame. The optical unit contains at least one light source, an objective, and at least one optical sensor, wherein the light source is configured to generate a light section, wherein at least one section of the inner contour is illuminable by the light section, wherein the objective is configured to image the illuminated section of the inner contour onto the optical sensor, and wherein the optical sensor is configured to capture the light reflected by the illuminated section of the inner contour.

25 Claims, 3 Drawing Sheets

(51) Int. Cl.
*G02C 1/00* (2006.01)
*G02C 7/02* (2006.01)

(58) Field of Classification Search
USPC .......................................................... 356/124
See application file for complete search history.

(56) References Cited

U.S. PATENT DOCUMENTS

| | | |
|---|---|---|
| 9,030,671 B2 | 5/2015 | Schneider et al. |
| 10,379,387 B2 | 8/2019 | Schön |
| 2013/0050712 A1 | 2/2013 | Samukawa et al. |
| 2020/0158496 A1 | 5/2020 | Takii et al. |

FOREIGN PATENT DOCUMENTS

| | | |
|---|---|---|
| DE | 19725159 C1 | 7/1998 |
| DE | 19721688 A1 | 9/1998 |
| DE | 19727226 A1 | 10/1998 |
| DE | 19919311 C1 | 2/2001 |
| DE | 10049382 A1 | 4/2002 |
| DE | 102010010340 B4 | 11/2013 |
| DE | 102011114048 B4 | 12/2013 |
| EP | 671679 B1 | 1/2000 |
| EP | 974038 B1 | 8/2002 |
| FR | 2713758 A1 | 6/1995 |
| KR | 1020180057732 A | 5/2018 |
| WO | 2019026416 A1 | 2/2019 |

OTHER PUBLICATIONS

Industrial Norm "Augenoptik—Brillenfassungen—Maßsystem und Begriffe (ISO 8624:2011) [Ophthalmic optics—Spectacle frames—Measuring system and terminology (ISO 8624:2011)],"relevance is found at least in paragraph [0028] of the specification as filed.
Smeets et al. "Contactless power transfer to a rotating disk," IEEE International Symposium on Industrial Electronics, IEEE, Piscataway, NJ, USA, Jul. 4, 2010, pp. 748 to 753.
International Search Report issued in PCT/EP2019/086338, to which this application claims priority, dated Jun. 22, 2020, and English-language translation thereof.
Written Opinion by the International Searching Authority issued in PCT/EP2019/086338, to which this application claims priority, dated Jun. 22, 2020.

US 11,243,139 B2

DEVICE AND METHOD FOR OPTICAL MEASUREMENT OF AN INTERNAL CONTOUR OF A SPECTACLE FRAME

CROSS REFERENCE TO RELATED APPLICATIONS

This application is a continuation application of international patent application PCT/EP2019/086338, filed Dec. 19, 2019, designating the United States and claiming priority from German patent application DE 102018222231.2, filed Dec. 19, 2018, and the entire content of both applications is incorporated herein by reference.

TECHNICAL FIELD

The present disclosure relates to an apparatus and a method for optical measurement of an inner contour of a spectacle frame, a system for optical measurement of a pair of spectacles, and a method for producing a pair of spectacles.

BACKGROUND

Various apparatuses and methods for measuring an inner contour of a spectacle frame are known from the related art. In this case, in particular, shape and profile of an inner contour of a spectacle frame rim, for example of a groove encircling an opening of a frame, are captured.

To this end, use can be made of, in particular, a so-called sensing probe or tracer. As a rule, the spectacle frame is clamped in a usually prismatic clamping apparatus of the tracer to this end. Following this, a tactile tip, usually in the form of a sphere with the diameter of approximately 1 mm, is driven into an inner depression of the profile of the spectacle frame. The tactile tip is situated on a rotatable platform and can be rotated 360°. In the process, the tactile tip rests against the profile base of the spectacle frame as a result of the contact force produced by the appliance. In accordance with the shape of the spectacle frame, the tactile tip can also carry out a radial movement in addition to the rotation. The simultaneous ascertainment of an angle of rotation and a radial deflection provides a set of polar coordinates, which are able to describe a contour in a plane. In the case of rectangular profiles, the measuring sphere can move in a manner orthogonal to the radius and to the spectacle contour within the profile, which frequently leads to measurement errors.

Furthermore, methods are known which ascertain contour and shape of the spectacle lens, for the purposes of which a shadow of the spectacle frame or a dummy lens is generated. An optical 2D projection allows the contour to be ascertained by means of a calibrated sensor system and imaging optical unit. A disadvantage of this is that this only allows capture of the outline but not of the contour of the edge.

The capture of the frame shape data of a spectacle frame or of a dummy lens in a tactile fashion by means of the tracer or optically in the form of the 2D projection causes measurement inaccuracies of at least 10%. As a consequence of these measurement inaccuracies, an edged spectacle lens often cannot be inserted into the spectacle frame without stresses and must be post-processed manually. However, manually fitting the lenses into the spectacle frame is the most complicated and most expensive work step when producing a pair of spectacles. Moreover, the probe head of tracers is usually so large that it cannot penetrate into a depression of a groove. This disadvantage is compensated for by allowances and continual calibration. Nevertheless, these days, approximately 10% of all edged spectacle lenses require post-processing.

DE 42 24 640 C2 discloses an appliance for automatically measuring shape and profile of an inner contour of a spectacle frame rim, the profile of which has a V-shape in the cross section, the centerline of which extends parallel to the principal plane of the spectacle frame rim. The appliance comprises at least one light source, which directs a plane parallel light beam at the inner contour of the spectacle frame rim, optical recording means for the rays of the incident light beam which are cast back by characterizing points of the inner contour of the spectacle frame rim, wherein the characterizing points are each formed by three points, of which one is located at the tip of the V and the other two each lie at an end of the V, and these characterizing points are successively recorded for a number of contour sections which are distributed in angled fashion along the inner contour of the spectacle frame rim, means for analyzing the recorded images in order to determine the spatial coordinates of the characterizing points, and computing means for calculating the shape and the profile of the inner contour of the spectacle frame rim proceeding from the spatial coordinates.

DE 93 17 381 U1 discloses an apparatus for contactless sensing of a groove base in an opening of a frame and storing the values obtained or directly controlling the processing of a spectacle lens blank with the aid of these values. The apparatus comprises a holder that carries the frame, a signal transducer arranged at the holder and rotatable relative to the frame opening about a perpendicular axis for coherent waves directed at the groove base, such as ultrasonic waves or laser beams, a first pickup for a relative angle position of the frame opening with respect to the signal transducer, a second pickup for the distance between the groove base and the signal transducer, a third pickup for a height of the signals in relation to the groove base, and a tracking device for the signal transducer controlled by the third pickup for tracking the signal transducer along the spatial curve of the groove base.

DE 199 19 311 C1 discloses a method and an apparatus for contactless sensing of a groove in an opening of a spectacle frame and/or the circumference of a spectacle lens or a former and for storing the values obtained or for directly controlling the processing of a lens blank with the aid of these values. The apparatus comprises a holder carrying the spectacle frame, the spectacle lens or the former, a light source which is arranged on a carrier, which is rotatable relative to the spectacle lens opening, to the spectacle lens or to the former about its axis and which directs a plane parallel light beam approximately perpendicular to the frame, spectacle lens or former plane or a grid on the inner contour of the frame opening or on the outer contour of the spectacle lens or of the former, an optical unit which is arranged in the plane perpendicular to the axis of rotation at the carrier at a the distance from the light source and which has a sensor matrix for recording the image of the light beam or the grid in the groove of the spectacle lens opening or on the circumference of the spectacle lens or the former, a pickup for the relative angle position of the spectacle lens opening in relation to the axis of the optical unit or of the light source, a sharpness adjustment or focusing apparatus coupled to the optical unit for the recorded image of the light beam or of the grid, a measuring transducer connected to the sharpness adjustment or focusing apparatus for converting the sharpness adjustment signals of the sharpness adjustment or focusing apparatus into values for the distance between the groove base or the circumference of the spectacle lens or the template and the axis, wherein the holder or the carrier is incrementally adjustable in the plane perpendicular to the axis of rotation by means of an adjustment device, a device coupled to the sensor matrix for capturing the height of the image of the groove or of the circumference of the spectacle lens or of the former, which supplies a measure for the profile of the spatial curve of the groove base or of the circumference of the spectacle lens or of the former in the direction of the axis, and an evaluation unit for combining the images of the groove or of the circumference of the spectacle lens or of the former to the three-dimensional spatial shape of the groove or the circumference.

EP 0 671 679 B1 discloses an apparatus and a method for contactless measurement of three-dimensional objects on the basis of optical triangulation, wherein the focused radiation emitted in the x-direction of a Cartesian x-, y-, z-coordinate system by a radiation source scans the surface of the object point-by-point and is reflected by the latter and the specular reflection is captured by means of radiation detection, and wherein the radiation source and the radiation detectors are situated in a scanning head that is swivelable and vertically linearly movable in the z-direction.

EP 0 974 038 B1 discloses a measuring arrangement and a method for contactless capture of a 3-dimensional spatial form of a circumferential groove in a spectacle frame. The measuring arrangement comprises a light source whose light beam is directed at the groove, an optical imaging system which images the light reflected at the groove onto an optical detector unit and which is arranged largely centrally in relation to the groove of the spectacle frame to be measured, a holding device carrying the spectacle frame, the holding device being rotatably mounted relative to the light source and the optical imaging system about a centration axis of an area inscribed by the circumferential groove of the spectacle frame, and an evaluation unit for ascertaining the 3-dimensional spatial form of the groove. The measuring arrangement is characterized in that the light source illuminates the groove with a single, line-shaped beam in a line-shaped region, in that provision is made of an optical deflection system which deflects the light beam from the light source onto the groove in such a way that the line-shaped beam is directed in substantially perpendicular fashion at the area inscribed by the circumferential groove of the spectacle frame, and in that the light source and the detector arrangement include a fixedly definable triangulation angle relative to the groove to be measured such that the application of the light section method for ascertaining the 3-dimensional spatial form of the groove is possible. A disadvantage here is that the spectacle frame is rotated about a vertical axis in order to determine the contour of the spectacle frame by means of mathematical methods. Therefore, the pair of spectacles must be re-clamped from its left side to its right side, as a result of which information about the eye spacing is lost.

DE 10 2010 010 340 B4 discloses a measuring arrangement and a method for optically measuring an inner side of a spectacle rim of a spectacle frame, which at least partly bounds an inscribed area corresponding to the spectacle lens shape. The apparatus comprises a holding device for mounting the spectacle frame, at least one light source for generating a light beam to be projected onto a region of the spectacle rim to be evaluated, at least one sensor, which is able to be coupled to the evaluation unit, for capturing the reflected light beam, wherein the holding device is rotatable about an axis of rotation and displaceable in the direction of a movement axis, and the movement axis has at least one movement component in a direction at right angles to the rotation axis. The apparatus is characterized in that the holding device serves to fix the spectacle frame with spectacle frame temples, wherein, in the region of the holding device, at least one clear space is provided and it serves to receive the spectacle frame temples of a spectacle frame to be held, which are not folded or are unable to be folded, wherein the clear space is provided on the side of the spectacle rim facing away from the light source and/or the sensor and a movement of the spectacle frame is ensured in a direction at right angles to the axis of rotation and the rotation of the spectacle frame.

DE 10 2011 114 048 B4 discloses an arrangement and a method for optical measurement of a spectacle frame groove. The arrangement comprises an optical recording unit which operates on the transmitted light principle and comprises an optical detector unit and an optical imaging system, a holding device for a spectacle frame to be measured, and a stylus whose geometry and dimensions are known. The arrangement is characterized in that the spectacle frame to be measured is detachably fastened to the holding device, the spectacle frame to be measured and the optical recording unit are pivotable relative to one another through 90° in such a way that the optical axis of the optical recording unit is aligned perpendicular to the front view of the spectacle frame to be measured in one pivot position and perpendicular to the side of view thereof in the other pivot position, and in that the stylus is visible and measurable in the front view pivot position in the transmitted light of the optical recording unit.

US 2013/0050712 A1 likewise discloses a triangulation method, by means of which the outer contour of spectacle lenses can be captured. In addition to the triangulation sensor, an axis system is used here, which is used for height and distance compensation. This compensation is carried out to avoid mirroring incidence of a laser beam on the optical sensor, in the case of which the incident laser beam and the optical axis of the imaging system each have the same angle to the perpendicular of the contour to be measured.

FR 2 713 758 A1 discloses an apparatus for automatically ascertaining the shape and/or the profile of an inner contour of an opening of a spectacle frame, comprising an optical device for capturing the image of characteristic points of the inner contour, an analysis unit for determining the spatial coordinates of the characteristic points, and a calculation unit for reconstructing the form and/or the profile of the contour of the spectacle frame from the spatial coordinates, wherein the optical device comprises a light source which produces a coherent light beam that impinges on the inner contour of the spectacle frame in punctiform fashion, and wherein the analysis and calculation unit reconstruct the profile by means of optical triangulation.

DE 199 19 311 C1 discloses a method and an apparatus for contactless sensing of the groove in the opening of a spectacle frame and/or the circumference of a spectacle lens or a former and for storing the values ascertained or for directly controlling the processing of a lens blank by means of these values.

DE 100 49 382 A1 discloses an optoelectronic measurement arrangement for measuring the geometry of lens edges, consisting of an illumination unit and an observation unit which is arranged relative to the illumination arrangement at a triangulation angle and under observation of the Scheimpflug condition. For measurement purposes, the lens is rotated about an axis of rotation relative to the measurement arrangement, and the illumination unit is widened to a light band which forms a light section approximately perpendicular to the plane of rotation of the lens.

DE 197 25 159 C1 discloses a measuring arrangement for capturing and measuring spectacle components, wherein the contour of the spectacle frame in the xy-plane is captured by means of an optoelectronic scanning device with a matrix camera that operates in contactless fashion. A second scanning device is assigned to the first scanning device, wherein the second scanning device consists of a one-dimensional triangulation measurement sensor and a mirror arrangement assigned thereto.

DE 197 21 688 A1 discloses a surface capturing device according to the triangulation principle for obtaining 3D data, with irradiation devices for irradiating at least some of the object surface to be captured and observation devices for imaging at least a portion of the irradiated part of the object surface to be captured on sensor devices for detection purposes. Furthermore, a method for capturing the surface according to the triangulation principle for obtaining 3D data is disclosed, wherein the radiation devices are used to irradiate at least some of the object surface to be captured and at least a portion of the irradiated part of the object surface to be captured is imaged on sensor devices by means of observation devices for detection purposes. To improve the obtainable measurement results, the radiation-sensitive surface 12 of the sensor devices, which forms the image plane of the observation devices, is set according to the Scheimpflug condition in this case.

Irrespective of the listed apparatuses and methods for measuring an inner contour of a spectacle frame, the centration of individually manufactured spectacle lenses along an ideal visual axis represents a significant challenge. Even though spectacle lenses, as a rule, are provided with permanent, usually laser signed reference marks, an ideal visual point for a spectacle wearer is however not evident in a spatial arrangement, and so there is a centration tolerance in the range of approximately ±5 mm even in the case of experienced opticians. As a consequence of this centration tolerance, the spectacle lens can be displaced so far from its ideal position that the spectacle wearer does not experience the expected correction within technical possibilities but instead expresses dissatisfaction with the centration or makes a complaint about the pair of spectacles due to incompatibility. In this context, it is observed that incompatibility with the pair of spectacles represents by far the most frequent reason for complaints by spectacle wearers.

SUMMARY

It is an object of the present disclosure to provide an apparatus and a method for optical measurement of an inner contour of a spectacle frame, a system for optical measurement of a pair of spectacles, and a method for producing a pair of spectacles, which at least partly overcome the stated disadvantages and limitations of the related art.

In particular, the apparatus and the method should facilitate an optical measurement of an inner contour of a spectacle frame rim, for example of a groove encircling an opening of the frame, but also of an outer contour of the spectacle frame, of a spectacle lens and/or of a dummy lens, with a high resolution within the shortest possible recording time.

Furthermore, the system for optical measurement of a pair of spectacles and the method for producing a pair of spectacles should facilitate an optical measurement of the inner contour of two spectacle frame rims of a frame and the associated distance between the two spectacle frame rims of the frame.

This object is achieved by an apparatus and a method for optical measurement of an inner contour of a spectacle frame, a system for optical measurement of a pair of spectacles, and a method for producing a pair of spectacles, as disclosed herein. Exemplary embodiments, which can be realized individually or in combination, are discussed below.

Hereinafter the terms "exhibit," "have," "comprise," or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" can refer both to the situation in which no further element aside from B is provided in A, that is to say to a situation in which A consists exclusively of B, and to the situation in which, in addition to B, one or more further elements are provided in A, for example element C, elements C and D, or even further elements.

In a first aspect, the present disclosure relates to an apparatus for optical measurement of an inner contour of a spectacle frame. In the context of the present disclosure, the term "pair of spectacles" is understood to mean any element having at least two components, a first component comprising at least one spectacle lens, typically two spectacle lenses, and the at least one further component, which can also be referred to as a "frame," has a holder for the at least one spectacle lens, typically for the two spectacle lenses, typically in the form of a spectacle frame or holding device for a spectacle lens. Here, the distinction can be made between "full rim spectacles," which have a spectacle frame rim surrounding each of the two spectacle lenses, "half rim spectacles," in which the two spectacle lenses are only partly enclosed by a holder, and "rimless spectacles," in which the spectacle lenses each have a drilled hole for receiving a holding device. Alternatively, a dummy lens can be introduced into the spectacle frame rim. Moreover, further components can be provided, in particular at least one temple for wearing the pair of spectacles on an ear and/or at least one pad to rest on a nose of a wearer of the pair of spectacles.

In the context of the present disclosure, a "spectacle lens" is to be understood to mean any element which is configured to influence electromagnetic waves in the range of the visible spectral range in order to alter, typically improve, the vision of a human or animal eye. To this end, the spectacle lens can be typically designed as a refractive optical lens or as a lens system comprising a plurality of refracting optical lenses. The spectacle lens may typically have an optically transparent material, selected in particular from glass, quartz, or a transparent organic plastic. In particular, the spectacle lens can have, at least in part along an edge, a taper for the introduction of the spectacle lens in a groove provided therefor and/or can have, in the vicinity of the edge of the spectacle lenses, drilled holes for attaching a holding device. The spectacle lens, which is generally present as a curved disk, consequently comprises an "outer contour," which denotes the profile of the circumferential shape of the spectacle lens at the side of the disk.

By contrast, the term "dummy lens" denotes any element made of a flat, optically transparent material, more particularly selected from glass, quartz, or a transparent organic plastic, which can be provided to produce a spectacle lens therefrom or to serve as a template for a spectacle lens, wherein the spatial dimensions of the dummy lens can approximate those of the spectacle lens. Pursuant to ISO 8624:2011, definition A.12, a dummy lens or a demonstration lens is a spectacle lens used for demonstration purposes in the spectacle frame without dioptric power. The dummy lens, which is generally present in the form of a flat disk, consequently comprises an "outer contour," which denotes the profile of the circumferential shape of the dummy lens at the side of the disk.

In the context of the present disclosure, the term "spectacle frame" denotes any element which is configured to receive at least one spectacle lens, typically two spectacle lenses. To this end, the spectacle frame can comprise a rim which is also referred to as "spectacle frame rim" and which, on each of the right and left side, respectively can have an opening referred to as a "receptacle" for one spectacle lens. The spectacle frame rim can be provided with one receptacle, typically with two receptacles, wherein each receptacle can be closed and can have a groove which encircles the inside of the frame and which is configured to receive the spectacle lens. The spectacle frame thus has an "inner contour," which denotes the profile of the shape encircling the inside of the spectacle frame rim. Typically, the spectacle frame rim can have a non-transparent material, in particular a firm but flexible and light material. Moreover, further components can be attached to the spectacle frame, in particular to the spectacle frame rim, in particular at least one temple for wearing a pair of spectacles on an ear and/or at least one pad to rest against a nose of the user of the pair of spectacles, the optical measurement of which, however, is not provided within the scope of the present disclosure.

In the context of the present disclosure, the term "optical measurement" of the inner contour is understood to mean any procedure configured to capture a shape of at least part of the inner contour, typically of the entire inner contour, in optical fashion. Hence, the present disclosure excludes, firstly, methods for measuring the inner contour in which a measuring device, for example a stylus, comes into contact with the inner contour and, secondly, methods in which the inner contour is measured in contactless fashion but not using an optical method, for example by way of impingement with ultrasound.

In this case, capturing the shape of at least part of the inner contour in optical fashion is implemented by irradiating a section of a surface of the inner contour with light, the surface of the inner contour reflecting some of the light and typically being imaged on at least one optical sensor by means of an objective, the at least one optical sensor being configured, in particular, to detect at least one property of the reflected light. In this case, the term "light" denotes electromagnetic waves in the range of the visible spectral range or in adjoining spectral ranges, in particular in the infrared range, typically in the near infrared range. In general, the measurement provides measurement values in the form of at least one electrical variable, for example a voltage or an electric current, from which the shape of the surface of the inner contour can be ascertained as three-dimensional measurement data by means of an algorithm, the measurement data typically being provided in the form of Cartesian coordinates x, y and z or, alternatively, as cylindrical coordinates r, φ and h or as polar coordinates ω, θ and r. However, other types of measurement values are possible. In this way, measurement data captured by a sensor can be converted into coordinates.

The proposed apparatus for optical measurement of an inner contour of a spectacle frame comprises an optical unit which is configured to capture light reflected from an illuminated section of the inner contour of the spectacle frame. In the context of the present disclosure, the term "optical unit" relates to any element configured to firstly generate light and secondly detect light. In a particularly preferred exemplary embodiment, the optical unit comprises at least one light source, an objective, and at least one optical sensor. In this exemplary embodiment, the light source adopts the task of generating the light while the objective and the optical sensor are configured to capture the light. In this case, it is particularly preferable for the light source, the objective, and the optical sensor to be fixedly arranged relative to one another.

In this case, the light source is configured to generate light in the form of a narrow, line-shaped region, which can also be referred to as "light section" or "light line." A laser can typically be suitable for the light source; however, other types of light sources, light-emitting diodes, for instance, are likewise possible. Therefore, a laser light source is particularly suitable for providing a light section since it is equipped to generate a laser light beam with a small aperture angle or, for instance by way of a quickly changeable tilt of the laser light beam along a line, a light line which therefore likewise has a small aperture angle.

The proposed apparatus is equipped in such a way that at least one section of the inner contour, typically exactly one section of the inner contour, is illuminable within a time interval by the light section provided by the light source, more particularly the laser light source. To this end, the optical element can furthermore comprise at least one optical deflection element which is configured to alter a direction of the light beam in a specifiable manner. In this case, the optical deflection element can alter the direction of the light beam by an angle greater than 0° to less than 180°, typically between 60° and 120°, in particular between 75° and 105°, for example by 90°. Mirrors, prisms, beam splitters, or optical gratings can typically be used as an optical deflection element. However, other types of optical deflection elements, which, in particular, can have a plurality of reflecting optical elements, are likewise possible.

In this case, the section of the inner contour impinged by the light section can comprise a defined part of the spectacle frame. In this case, the term "section" denotes a region of the inner contour that is less than the entire surface of the inner contour. In particular, the section of the inner contour can comprise a defined angular range, typically from 0.25° to 10°, particularly typically from 0.5° to 2.5°, in particular from 1.0° to 2°, of the inner contour of the spectacle frame. Particularly advantageously, the angular range can be chosen in such a way that it facilitates a sufficient resolution of the optical capture of the inner contour within a short time interval. However, other types of sections or values for the angular range are possible.

In this way, the objective can generate an individual image of the illuminated section of the inner contour on the sensor area of the optical sensor. However, according to the disclosure, in order to be able to optically measure further parts of the shape of the spectacle frame, in particular the entire outer contour of the spectacle frame, the optical unit is insertable into the inner contour of the spectacle frame and, when inserted into the inner contour of the spectacle frame as intended, is mounted so as to be rotatable relative to the spectacle frame. The term "insertable" in this case denotes that the optical unit, which, as described above, comprises at least one light source, an objective, and at least one optical sensor, is movable in such a way that it is able to at least contact, but is typically able to intersect, an imaginary plane during the optical measurement of the inner contour of the spectacle frame, the imaginary plane being creatable from at least three points on the inner contour of the spectacle frame, while the spectacle frame is typically mounted in stationary fashion in the process. The term "as intended" denotes the insertion of the optical unit into the inner contour of the spectacle frame for the purpose of the optical measurement of the inner contour of the spectacle frame.

Furthermore, the term "mounted so as to be rotatable relative to the spectacle frame" means that, firstly, the optical unit is arrangeable relative to the spectacle frame in such a way that at least two separate sections of the inner contour of the spectacle frame, typically the entire inner contour, are illuminable by means of the light section and that the optical sensor is configured to capture an image of the respectively illuminated section by virtue of the optical unit being rotatable. To this end, the apparatus can comprise a rotation device which is configured to rotate the entire optical unit. The optical unit, which is rotatable by the rotation device, and the spectacle frame can typically be arranged relative to one another in such a way that the entire inner contour can already be traversed by the light section by way of a rotation; a further change in the optical unit or in the spectacle contour during the optical measurement can be dispensed with. In this way, the optical unit can be rotated, in each case by specifiable steps, in particular by a specifiable angular range, typically from 0.25° to 10°, particularly typically from 0.5° to 2.5°, in particular from 1.0° to 2°. Hence, the optical sensor can be configured to record a respective image for each of the 30 to 1500, typically from 36 to 1440, more typically from 144 to 720, in particular from 180 to 360 respectively illuminated sections of the inner contour.

Especially in order to determine a value for the angle, the optical unit can furthermore comprise a device configured for this purpose. In a special exemplary embodiment, the device for determining a value can comprise a device for producing an index, the index generated thereby being related to the angle to be determined. However, other types of determination of a value for the angle are possible.

Hence, the present apparatus for optical measurement of the inner contour of spectacle frames differs from the apparatus from EP 0 974 038 B1, which requires a rotation of the spectacle frame. Since, according to the disclosure, the rotation of the spectacle frame itself is omitted, it is consequently no longer necessary to re-clamp the pair of spectacles from its left side to its right side, as a result of which, as described in more detail below, information about the eye spacing is also able to be captured.

The spectacle frame to be measured can be received by a holding device, wherein the holding device can typically be matched to the shape of the spectacle frame. In this case, the holding device can be provided in addition to the proposed apparatus. In particular, the holding device can be configured to be fixed in relation to the optical unit. Typically, the spectacle frame to be measured can be able to be fastened in releasable fashion to the holding device receiving the latter, typically by mechanical latching, magnetic fastening, or a releasable adhesive bond. However, other types of fastening are possible.

As a consequence of this illumination by the light section, the respective section of the inner contour of the spectacle frame reflects some of the laser light impinging thereon. In the case where the spectacle frame impinged upon by the light section is entirely or partly transparent, scattering centers can be provided in the spectacle frame, in particular by a typically temporary application of a coating on the spectacle frame, typically by means of an emulsion and/or microparticles. As a result of the reflection at the surface of the inner contour of the spectacle frame or at the coating applied thereon, some of the laser light can be cast back, for example by total-internal reflection, and thus reaches the optical sensor through the objective, these being positionable in such a way that the reflected portion of the laser light impinges on the optical sensor. For the present measurement of the inner contour, it is sufficient if only a small proportion of the light, for instance only 0.1% to 10% of the light emitted by the light source, can be captured by the at least one optical sensor. However, reflecting a proportion of the light of 10% or more might be advantageous for a higher signal-to-noise ratio.

The part of the optical unit configured to capture the light reflected by the illuminated section of the inner contour in this case comprises at least one optical sensor. In this case, the term "optical sensor" denotes an arbitrary optical detector unit which, depending on an impingement of an optical sensitive sensor area of the optical sensor with light, is able to generate an electric variable, for example a voltage or an electric current, as measurement value, which can serve as an input variable for further processing in one or more algorithms. In a particularly typical exemplary embodiment, the captured measurement data can be based on a capture of the light reflected by the illuminated section of the inner contour of the spectacle frame and consequently be related to, in particular, the component of the reflected light captured by the optical sensor. As already mentioned above, the shape of the surface of the inner contour can be ascertained as three-dimensional measurement data in this way. However, in principle, other types of providing the measurement values are possible. The optical sensor can typically be provided in the form of a sensor matrix, which comprises a plurality of individually readable sensor pixels. In a particularly typical exemplary embodiment, the optical sensor can have a diameter ranging from 5 mm to 25 mm, in particular from 10 mm to 20 mm. Typically, a CCD sensor matrix can be suitable as an optical sensor. However, other types of optical sensors are possible.

The part of the optical unit configured to capture the light reflected by the illuminated section of the inner contour comprises an objective in addition to the at least one optical sensor. In principle, the term "objective" or "optical imaging unit" relates to at least one converging optical element which is configured to generate a real optical image of an object, typically focused to the greatest possible extent on the sensor area of the optical sensor. Consequently, the objective can comprise at least one converging optical element, for example a single converging lens, but typically a plurality of optical lenses that are matched to one another. A preferred exemplary embodiment of the object for the proposed apparatus is found in the exemplary embodiments.

As explained in EP 0 974 038 B1, the laser light source is able to project a light line onto the section of the inner contour of the spectacle frame to be measured, wherein the reflection of the light line can be detected by an optical sensor which is attached at a triangulation angle γ relative to the laser light source. Consequently, on the basis of an equation (1), which is based on triangulation and which states that $$\Delta x = \beta \cdot \sin \gamma \cdot \Delta z, \quad (1)$$

where $\Delta x$ denotes a spacing of two measurement points in the image of the inner contour on the optical sensor, $\Delta z$ denotes a spacing of two measurement points on the surface of the inner contour, and β denotes an imaging scale of the objective, it is possible to ascertain the spacing $\Delta z$ of two measurement points on the surface of the inner contour. In this case, the term "triangulation" denotes a geometric method which facilitates an optical distance measurement by capturing angles within a triangle by measurement. In a particularly preferred configuration, it is possible as a matter of principle to ascertain any further point in space by capturing two angles by measurement proceeding from two points whose mutual spacing is known. However, EP 0 974 038 B1 does not specify a possible value for the triangulation angle γ.

The general lens equation:

$$1/a + 1/b = 1/f, \qquad (2)$$

where a denotes the object distance, b denotes the image distance and f denotes the focal length of the objective, shows the precondition under which an image point imaged in focus on an image-side plane of focus can be assigned to every point of an object. In a conventional camera, object-side plane of focus, objective plane and image-side plane of focus are arranged parallel to one another, with the object distance a specifying a distance between the object-side plane of focus and the objective plane and the image distance b specifying a distance between the objective plane and the image-side plane of focus. In this case, the terms "image-side plane of focus" or "image plane" denote a planar region in the image space of the optical sensor, in particular on the optically sensitive sensor area of the optical sensor, in which a sharply imaged image point can be generated from points of the object provided that the object is situated in the object-side plane of focus. The terms "object-side plane of focus" or "object plane" denote a planar region of the object, in which a sharply imaged image point can be assigned to each individual point of the object, while the terms "objective plane" or "objective-side principal plane" denote a plane formed at right angles to the optical axis of the objective.

In contrast to the parallel arrangement of object-side plane of focus, objective plane and image-side plane of focus as in a conventional camera, the so-called "Scheimpflug rule" can typically be considered here and hence the light source, the illuminable section of the inner contour, the objective, and the at least one optical sensor can be arranged relative to one another in such a way that the section of the inner contour illuminable by the light section is able to be placed into the object-side plane of focus of the inner contour and the at least one optical sensor is able to be arranged in the image-side plane of focus, wherein the object-side plane of focus, the objective plane and the image-side plane of focus intersect in a common straight line, a theoretically conceivable limit case of these three aforementioned planes intersecting at infinity expressly being precluded herefrom. What can advantageously be achieved by the arrangement proposed here, of the light source, the respectively illuminated section of the inner contour, the objective, and the optical sensor is that the respectively illuminated section of the inner contour can always be imaged in focus on the image-side plane of focus in the optical sensor, in particular on the optically sensitive sensor area of the optical sensor. In this way, a distance may be determined between the optical sensor and the illuminated section of the inner contour, for example by means of an optical method for determining a distance, typically by means of triangulation, wherein from the distance the geometric shape of the inner contour in particular may be ascertained. In this exemplary embodiment, too, the apparatus can adopt a predetermined spatial arrangement in relation to the spectacle frame even though the spectacle frame itself is not an object of the apparatus.

In this case, a predetermined space can be provided for the spectacle frame, the spectacle frame being arrangeable therein in relation to the apparatus, typically with the Scheimpflug rule being taken into account, according to which the light source, the illuminable section of the spectacle frame, the objective, and the at least one optical sensor can be arranged relative to one another as described.

In this arrangement, the general lens equation (2) can be written as follows:

$$\tan \varphi = \beta \cdot \tan \theta, \qquad (3)$$

where θ denotes an angle between the object-side plane of focus and the objective plane, φ denotes an angle between the objective plane and the image-side plane of focus, and β once again denotes the imaging scale of the objective. In a particularly preferred exemplary embodiment, the angle θ between the object-side plane of focus and the objective plane can adopt a value ranging from 60° to 85°, typically from 65° to 80°, in particular from 70° to 75°, while the angle φ between the objective plane and the image-side plane of focus can adopt a value ranging from 15° to 75°, typically from 30° to 60° and, in particular from 40° to 50°. What emerges from this, in particular, is that the object-side plane of focus and the image-side plane of focus are arranged at an angle of inclination with respect to one another, with an angle of inclination ranging from 75° to 160°, typically from 95° to 140°, in particular from 100° to 125°, being preferred. In a particularly preferred exemplary embodiment, this angle of inclination can be maintained in the case of a movement of the optical unit in relation to the inner contour to be measured, typically by means of the rotation device for the optical unit, in particular for the purposes of measuring the entire shape of the inner contour.

In a further exemplary embodiment, the optical unit can comprise a second rotation device, wherein the latter may be used to align and lock the optical device. By way of example, a combination of threaded pin and a plastic ball can be used for locking purposes. The second rotation device can suck a spectacle lens thereagainst by means of a vacuum and rotate the spectacle lens in front of the objective, it being preferable for the rotation to be able to be synchronized with an image recording frequency. In this exemplary embodiment, it is possible to additionally ascertain the outer contour of the spectacle lens, a dummy lens, or the spectacle frame.

In a particularly preferred exemplary embodiment, the optical unit can furthermore comprise a device for data reduction. In this case, the term "data reduction" denotes a reduction in the scale of measurement data in relation to raw data which, in particular, are captured by the at least one optical sensor. The device for data reduction can typically comprise a computer, a microcomputer, or a programmable chip, for example an application-specific integrated circuit (ASIC) or particularly typically an FPGA field programmable gate array). The raw data supplied by the optical sensor can be reduced by a factor of at least 50, typically of at least 100, particularly typically of at least 250 in this case before they are provided as reduced measurement data to an evaluation unit, which is described in more detail below. In particular, filters can be applied in this case. By way of example, if the light section is guided over the inner contour of the spectacle frame from right to left, it is typically possible to choose edge detection which can set a threshold from this direction. Moreover, it is possible, in particular, to filter possibly occurring mirroring and/or highlights from the raw data.

In a particularly preferred exemplary embodiment, in which the angle between the perpendicular to the normal of the section to be observed and the laser beam and also the optical axis of the objective is equal, a large part of the laser light can disadvantageously be mirrored directly into the objective, which can lead to a pronounced overexposure. To be able to limit such disadvantageous effects, the device for data reduction can furthermore comprise a gain control, which can be configured to compensate for brightness variations on the optical sensor of the light reflected from the inner contour.

In a further preferred exemplary embodiment, the optical unit can furthermore comprise a device for optical data transfer. The term "device for data transfer" in this case also relates to a device referred to as a "transceiver," which is equipped to transmit the measurement data, in particular the raw data or, typically, the reduced measurement data captured therefrom, to the evaluation unit. Further details regarding the device for optical data transfer are described below in conjunction with the presentation of the system for optical measurement of a pair of spectacles.

In a further preferred exemplary embodiment, provision can be further made of a device for supplying energy to the optical unit. In this case, the term "a device for supplying energy" denotes a device which provides the energy required to operate the components of the optical unit. In this case, further details regarding the device for supplying energy are likewise described below in conjunction with the presentation of the system for optical measurement of a pair of spectacles. However, the optical unit can alternatively also have an autonomous configuration and, in particular, be operated in this case by means of an energy storage unit, typically a battery.

In a further aspect, the present disclosure relates to a method for optical measurement of an inner contour of a spectacle frame. The method comprises the following steps a) to d), typically in the specified order, with, however, it being possible for the method steps, in particular successive method steps, to be carried out at least partly simultaneously. It is furthermore possible for individual, multiple or all steps of the method to be performed repeatedly, in particular more than once. In addition to the stated method steps, the method may also comprise further method steps.

The method steps of the method for optical measurement of an inner contour of a spectacle frame comprise:
a) providing a spectacle frame and an apparatus for optical measurement of an inner contour of the spectacle frame, comprising an optical unit, wherein the apparatus comprises an optical unit which is configured to capture a light reflected by an illuminated section of the inner contour of the spectacle frame;
b) illuminating at least one section of the inner contour;
c) imaging the illuminated section of the inner contour; and
d) capturing a light reflected by the illuminated section of the inner contour, wherein the optical unit is inserted into the inner contour of the spectacle frame and rotated relative to the spectacle frame for the purpose of carrying out the optical measurement.

In a preferred exemplary embodiment, the light source, the illuminated section of the inner contour, the objective, and the optical sensor are arranged relative to one another in such a way that the section of the inner contour illuminated by the light section is placed into an object-side plane of focus and that the optical sensor is arranged in an image-side plane of focus, wherein the object-side plane of focus, an objective plane, and the image-side plane of focus intersect in a common straight line.

For further details in relation to the present method, reference is made to the description above of the apparatus for optical measurement of an inner contour of a spectacle frame and to the exemplary embodiments.

In a further aspect, the present disclosure relates to a system for optical measurement of a pair of spectacles. In this case, the system comprises at least one or two separate apparatuses for optical measurement of an inner contour of a spectacle frame, typically exactly one or exactly two apparatuses for optical measurement of an inner contour of a spectacle frame, which are described in more detail elsewhere in this document, and an evaluation unit. Moreover, reference is made to the description of the apparatus and of the method for optical measurement of an inner contour of a spectacle frame in respect of definitions and optional exemplary embodiments of the system.

In this case, the term "evaluation unit" denotes an arbitrary device configured to receive, process, and output data. The evaluation unit can typically be an electronically or optoelectronically controllable measuring unit which may be equipped with, in particular, a computer, a microcomputer or a programmable chip, e.g., an application-specific integrated circuit (ASIC) or an FPGA (field-programmable gate array), wherein the measuring device can access one or more computer programs, which may be configured to carry out the methods described herein. However, other exemplary embodiments of the evaluation unit are possible, typically an integration of the evaluation unit in the proposed apparatus or the proposed system.

The system for optical measurement of a pair of spectacles can consequently comprise a stationary primary arrangement and a rotatable secondary arrangement, wherein the primary arrangement comprises at least the evaluation unit and the secondary arrangement comprises at least the optical unit and wherein the primary arrangement and the secondary arrangement are rotatably connected to one another by way of a connection, embodied as a bearing, in a bearing plane.

In a particularly preferred exemplary embodiment, the energy transfer from the stationary primary arrangement to the rotatable secondary arrangement can be implemented by means of a device for supplying energy to the optical unit, which is arranged in the bearing plane. The device for supplying energy to the optical unit can typically have a split transformer in this case, which can comprise stationary components in the primary arrangement and rotatable components in the secondary arrangement. However, other types of energy supply are conceivable.

In a further particularly preferred exemplary embodiment, the data transfer from the rotatable secondary arrangement to the stationary primary arrangement can be implemented by way of a device for optical data transfer, which is also referred to as a "transceiver" and which is configured to transmit the measurement data, in particular the raw data or, typically, the reduced measurement data captured therefrom, to the evaluation unit. To this end, use can typically be made of two opposing light-emitting diodes (LEDs), for the purpose of which it is possible to exploit the fact that one light-emitting diode can be wired as an optical transmitter and/or as an optical receiver. Typically, the measurement data can be transferred in a half-duplex method in this case. Other types of devices or methods for data transfer are conceivable.

In a particularly preferred exemplary embodiment, the exactly one apparatus in the system has a movable configuration or the exactly two apparatuses in the system are arranged at a changeable distance from one another, wherein the evaluation unit is configured to determine a spatial assignment of the two spectacle lenses in the pair of spectacles from a movement of the exactly one apparatus or the distance of the exactly two apparatuses. In this case, the term "spatial assignment of the two spectacle lenses" denotes a geometric alignment of each of the two spectacle lenses in relation to the respective other spectacle lens in relation to the spectacle frame. In this case, the spatial assignment of the two spectacle lenses can comprise, in particular, determining a distance between the two spectacle lenses, a displacement of the two spectacle lenses in relation to optical axis of the pair of spectacles, and/or an inclination of the two spectacle lenses with respect to one another.

In a further aspect, the present disclosure relates to a method for producing a pair of spectacles, which includes the following steps:

(i) providing two spectacle lenses;
(ii) optically measuring the spectacle frame, which has two separate receptacles for the spectacle lenses, comprising the steps of:
a) providing the spectacle frame and an apparatus for optical measurement of an inner contour of the spectacle frame, comprising an optical unit, wherein the apparatus comprises an optical unit which is configured to capture light reflected by an illuminated section of the inner contour of the spectacle frame;
b) illuminating at least one section of the inner contour of the spectacle frame;
c) imaging the section of the inner contour; and
d) capturing light reflected by the illuminated section of the inner contour,
(iii) assembling the two spectacle lenses and the spectacle frame,
wherein, in step (ii), the optical unit is inserted into the inner contour of the spectacle frame and rotated relative to the spectacle frame and wherein a spatial assignment of the two receptacles for the two spectacle lenses in the spectacle frame is ascertained.

In this way, the present method for producing a pair of spectacles facilitates, typically a simultaneous or directly successive measurement of the inner contours of each of the two receptacles for the spectacle lenses in the spectacle frame and a spatial assignment between the two receptacles. By carrying out the optical measurement of the two receptacles with a time overlap, typically in parallel, by one apparatus for each receptacle or by the same apparatus, which is configured to be movable from the first receptacle in the spectacle frame rim to a second receptacle in the spectacle frame rim, wherein positions of a movement carried out in the process are ascertainable, a measurement of the two receptacles for the two spectacle lenses in the spectacle frame rim may be done considerably faster and, moreover, the desired spatial assignment between the two spectacle lenses in the spectacle frame may be ascertained.

In this way, the present method for producing a pair of spectacles facilitates, typically a simultaneous or directly successive measurement of the inner contours of each of the two receptacles for the spectacle lenses in the spectacle frame and a spatial assignment between the two receptacles. By carrying out the optical measurement of the two receptacles with a time overlap, typically in parallel, by one apparatus for each receptacle or by the same apparatus, which is configured to be movable from the first receptacle in the spectacle frame rim to a second receptacle in the spectacle frame rim, wherein positions of a movement carried out in the process are ascertainable, a measurement of the two receptacles for the two spectacle lenses in the spectacle frame rim may be done considerably faster and, moreover, the desired spatial assignment between the two spectacle lenses in the spectacle frame may be ascertained.

In respect of further details relating to the method for producing a pair of spectacles, reference is therefore made to the method for optical measurement of an inner contour of a spectacle frame and to the system for measuring a pair of spectacles.

The apparatus and the method for optical measurement of an inner contour of a spectacle frame advantageously facilitate an optical measurement of an inner contour of a spectacle frame rim, for example of a groove encircling an opening in a frame, with a high resolution and within a short period of time and, moreover, optionally also facilitate the optical measurement of an outer contour of the spectacle frame. The system for optical measurement of a pair of spectacles and the method for producing a pair of spectacles allow simultaneous optical measurements, or optical measurements immediately following one another, of the inner contours of two spectacle frame rims of a spectacle frame with a high resolution and within a period of time further reduced thereby, with ascertainment of the mutual distance of the two spectacle lenses in a pair of spectacles. This can significantly simplify the centration of individually manufactured spectacle lenses with respect to an ideal visual axis. As a consequence, the centration tolerance can be reduced to such a scale that the spectacle wearer can now experience the expected correction possible from a technical point of view, by virtue of being able to perceive the desired compatibility of the pair of spectacles. Complaints on account of an incompatibility of the pair of spectacles for the spectacle wearer should therefore be reduced significantly.

In summary, in the context of the present disclosure, the following exemplary embodiments are particularly preferred:

Exemplary embodiment 1. Apparatus for optical measurement of an inner contour of a spectacle frame, comprising an optical unit which comprises at least one light source, an objective, and at least one optical sensor, wherein the light source is configured to generate a light section, wherein at least one section of the inner contour is illuminable by means of the light section, wherein the objective is configured to image the illuminated section of the inner contour onto the optical sensor, and wherein the optical sensor is configured to capture light reflected from the illuminated section of the inner contour, wherein the optical unit is insertable into the inner contour of the spectacle frame and, when inserted into the inner contour of the spectacle frame as intended, is mounted so as to be rotatable relative to the spectacle frame.

Exemplary embodiment 2. Apparatus according to the preceding exemplary embodiment, wherein the optical unit comprises at least one light source, an objective and at least one optical sensor, wherein the light source is configured to generate a light section, wherein at least one section of the inner contour is illuminable by means of the light section, wherein the objective is configured to image the illuminated section of the inner contour onto the optical sensor, and wherein the optical sensor is configured to capture the light reflected by the illuminated section of the inner contour.

Exemplary embodiment 3. Apparatus according to the preceding exemplary embodiment, wherein the light source, the illuminable section of the inner contour, the objective, and the optical sensor are arranged relative to one another in such a way that the section of the inner contour that is illuminable by the light section is placeable into an object-side plane of focus and that the optical sensor is arrangeable in an image-side plane of focus, wherein the object-side plane of focus, an objective plane, and the image-side plane of focus intersect in a common straight line.

Exemplary embodiment 4. Apparatus according to the preceding exemplary embodiment, wherein an angle θ between the object-side plane of focus and the objective plane assumes a value ranging from 60° to 85° and an angle φ between the objective plane and the image-side plane of focus assumes a value ranging from 15° to 75°.

Exemplary embodiment 5. Apparatus according to the preceding exemplary embodiment, wherein an angle θ between the object-side plane of focus and the objective plane assumes a value ranging from 65° to 80° and an angle φ between the objective plane and the image-side plane of focus assumes a value ranging from 30° to 60°.

Exemplary embodiment 6. Apparatus according to the preceding exemplary embodiment, wherein an angle θ between the object-side plane of focus and the objective plane assumes a value ranging from 70° to 75° and an angle φ between the objective plane and the image-side plane of focus assumes a value ranging from 40° to 50°.

Exemplary embodiment 7. Apparatus according to any one of the preceding exemplary embodiments, wherein the optical unit is rotatable by an angle in such a way that at least two separate sections of the inner contour are illuminable by means of the light section.

Exemplary embodiment 8. Apparatus according to any one of the preceding exemplary embodiments, wherein the section of the inner contour comprises a defined angular range, typically from 0.1° to 10°, particularly typically from 0.25° to 2.5°, in particular from 0.5° to 2°, of the inner contour of the spectacle frame.

Exemplary embodiment 9. Apparatus according to any one of the preceding exemplary embodiments, wherein the optical sensor is configured to record a respective image for each of the 30 to 1500, typically from 36 to 1440, more typically from 144 to 720, in particular from 180 to 360 respectively illuminated sections of the inner contour.

Exemplary embodiment 10. Apparatus according to any one of the preceding exemplary embodiments, wherein the optical unit further comprises a device for determining a value for the angle.

Exemplary embodiment 11. Apparatus according to the preceding exemplary embodiment, wherein the device for determining a value for the angle comprises a device for generating an index, the index being related to the angle.

Exemplary embodiment 12. Apparatus according to any one of the preceding exemplary embodiments, wherein provision is further made of a rotation device for rotating the optical unit in relation to the spectacle frame.

Exemplary embodiment 13. Apparatus according to any one of the preceding exemplary embodiments, wherein provision is further made of a holding device receiving the spectacle frame, to which the spectacle frame is able to be fastened in detachable fashion.

Exemplary embodiment 14. Apparatus according to the preceding exemplary embodiment, wherein the holding device is rotatable while the optical unit is securable in an adjustable angle position.

Exemplary embodiment 15. Apparatus according to the preceding exemplary embodiment, wherein the holding device is rotatable while the optical unit is securable in an adjustable angle position.

Exemplary embodiment 16. Apparatus according to the preceding exemplary embodiment, wherein the holding device is mounted in rotatable fashion in such a way that the optical measurement of an outer contour of the spectacle frame is able to be carried out.

Exemplary embodiment 17. Apparatus according to any one of the preceding exemplary embodiments, wherein the optical unit furthermore comprises at least one optical deflection element, wherein the optical deflection element is configured to direct the light beam in the form of a light section, generated by the light source, onto the section of the inner contour to be illuminated.

Exemplary embodiment 18. Apparatus according to the preceding exemplary embodiment, wherein the optical deflection element is selected from a mirror, a prism, a beam splitter, an optical grating, or an optical component which has a plurality of reflecting optical elements.

Exemplary embodiment 19. Apparatus according to any one of the two preceding exemplary embodiments, wherein the optical deflection element has a movable configuration such that at least two separate sections of the inner contour are illuminable by means of the light section.

Exemplary embodiment 20. Apparatus as according to any one of the preceding exemplary embodiments, wherein the optical unit is furthermore configured to capture measurement data, wherein captured measurement data are based on the capture of the light reflected by the illuminated section of the inner contour of the spectacle frame.

Exemplary embodiment 21. Apparatus according to the preceding exemplary embodiment, wherein the provision is further made of a device for data reduction, wherein the device for data reduction is configured to reduce a scale of the captured measurement data.

Exemplary embodiment 22. Apparatus according to the preceding exemplary embodiment, wherein the device for data reduction has a gain control, wherein the gain control is configured to compensate for brightness variations in the reflected light which have an effect on the captured measurement data.

Exemplary embodiment 23. Apparatus according to any one of the preceding exemplary embodiments, wherein provision is further made of a device for optical data transfer, wherein the device for optical data transfer is configured to transmit the measurement data to an evaluation unit.

Exemplary embodiment 24. Method for optical measurement of an inner contour of a spectacle frame, comprising the steps of:
a) providing a spectacle frame and an apparatus for optical measurement of an inner contour of the spectacle frame according to any one of exemplary embodiments 1 to 23, comprising an optical unit, wherein the apparatus comprises an optical unit which is configured to capture light reflected by an illuminated section of the inner contour of the spectacle frame;
b) illuminating at least one section of the inner contour of the spectacle frame;
c) imaging the illuminated section of the inner contour; and
d) capturing light reflected by the illuminated section of the inner contour,
wherein the optical unit is inserted into the inner contour of the spectacle frame and rotated relative to the spectacle frame.

Exemplary embodiment 25. Method according to the preceding exemplary embodiment, wherein the light source, the illuminated section of the inner contour, the objective, and the optical sensor are arranged relative to one another in such a way that the section of the inner contour illuminated by the light section is placed into an object-side plane of focus and that the optical sensor is arranged in an image-side plane of focus, wherein the object-side plane of focus, an objective plane, and the image-side plane of focus intersect in a common straight line.

Exemplary embodiment 26. System for optical measurement of a pair of spectacles, comprising at least one apparatus for optical measurement of an inner contour of a spectacle frame according to any one of exemplary embodiments 1 to 23 and an evaluation unit, wherein the evaluation unit is configured to determine a spatial assignment between the two spectacle lenses in the spectacle frame.

Exemplary embodiment 27. System according to the preceding exemplary embodiment, wherein provision is made of exactly two apparatuses and wherein the exactly two apparatuses are arranged at a modifiable distance from one another.

Exemplary embodiment 28. System according to the preceding exemplary embodiment, wherein the distance of the two apparatuses is settable in relation to an alterable distance for spectacle lenses.

Exemplary embodiment 29. System according to any one of the three preceding exemplary embodiments, wherein provision is further made of a device for supplying energy to the optical unit.

Exemplary embodiment 30. System according to the preceding exemplary embodiment, wherein the device for supplying energy comprises a rotatable transformer.

Exemplary embodiment 31. Method for producing a pair of spectacles, comprising the following steps:
(i) providing two spectacle lenses;
(ii) optically measuring the spectacle frame, which has two separate receptacles for the spectacle lenses, comprising the steps of:
a) providing the spectacle frame and an apparatus for optical measurement of an inner contour of the spectacle frame according to any one of exemplary embodiments 1 to 23, comprising an optical unit, wherein the apparatus comprises an optical unit which is configured to capture light reflected by an illuminated section of the inner contour of the spectacle frame;
b) illuminating at least one section of the inner contour of the spectacle frame;
c) imaging the illuminated section of the inner contour; and
d) capturing light reflected by the illuminated section of the inner contour,
(iii) assembling the two spectacle lenses and the spectacle frame,
wherein, in step (ii), the optical unit is inserted into the inner contour of the spectacle frame and rotated relative to the spectacle frame, and in that a spatial assignment of the two spectacle lenses in the spectacle frame is ascertained.

Exemplary embodiment 32. Method according to the preceding exemplary embodiment, wherein the spatial assignment of the two spectacle lenses in the spectacle frame is ascertained by determining a distance between the two spectacle lenses, a displacement of the two spectacle lenses in relation to an optical axis of the pair of spectacles, and/or an inclination of the two spectacle lenses with respect to one another.

BRIEF DESCRIPTION OF THE DRAWINGS

The disclosure will now be described with reference to the drawings wherein.

DESCRIPTION OF EXEMPLARY EMBODIMENTS

Figure 1:
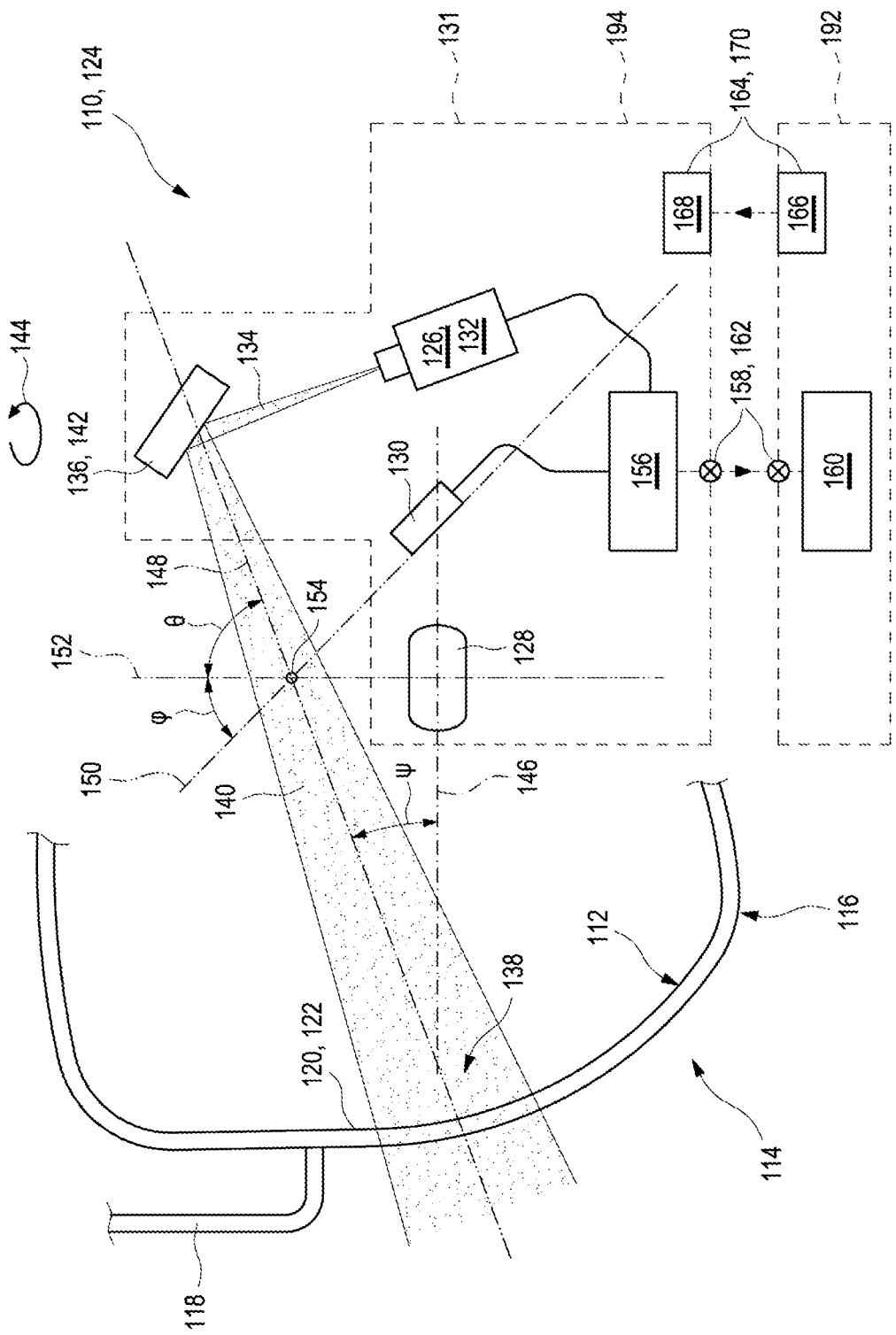
FIG. 1 shows a schematic illustration of an exemplary embodiment of an apparatus for optical measurement of an inner contour of a spectacle frame.

Further details and features of the disclosure will become apparent from the following description of preferred exemplary embodiments, in particular in conjunction with the dependent claims. In this case, the respective features can be realized by themselves or as a plurality in combination with one another. The disclosure is not restricted to the exemplary embodiments. The exemplary embodiments are illustrated schematically in the drawings. Identical reference numerals in the individual figures denote identical or functionally identical elements or elements corresponding to one another with regard to their functions.

FIG. 1 shows a schematic illustration of a preferred exemplary embodiment of an apparatus 110 for optical measurement of an inner contour 112 of a spectacle frame 116 of a pair of spectacles 114, of which, however, only a section is illustrated in FIG. 1. Further possible components attached to the spectacle frame 116, such as temples 118 and/or pads (not illustrated here), remain unconsidered during the optical measurement. In this case, the spectacle frame 116 is configured, in particular, to receive two separate spectacle lenses (not illustrated here). To this end, the spectacle frame can comprise a spectacle frame rim 120 which, on each of the right and left side, respectively can have a receptacle 122 for one spectacle lens. Each receptacle 122 can be closed and can have a circumferential groove (not illustrated here) on the inside of the spectacle frame rim 120, it being possible for the groove to be configured to receive the spectacle lens. In this case, the inner contour 112 refers to, in particular, a profile of the circumferential shape on the inside of the spectacle frame rim 120. Typically, the spectacle frame rim 120 can have a non-transparent material, in particular a firm but flexible and light material. In the case where the spectacle frame 116 is entirely or partly transparent, scattering centers can be provided in the spectacle frame 116, in particular by a typically temporary application of a coating on the spectacle frame 116, typically by means of an emulsion and/or microparticles.

The apparatus 110 comprises an optical unit 124 which comprises at least one light source 126, an objective 128, and an optical sensor 130 in the exemplary embodiment as per FIG. 1. In the present exemplary embodiment, the light source 126, the objective 128, and the optical sensor 130 are fixedly arranged relative to one another in a housing 131, which can have an at least partly transparent configuration. A laser 132 can typically be used as a light source 126; other types of light sources, for instance light-emitting diodes, are likewise possible. In the apparatus 110 illustrated in FIG. 1, the laser 132 generates a light beam 134 with a small aperture angle ranging from 2° to 15°, typically from 5° to 10°, which initially impinges on an optical deflection element 136. In this case, the optical deflection element 136 is configured to alter a direction of the light beam 134 in such a way that a section 138 of the inner contour 112 of the spectacle frame 116 is able to be illuminated by light in the form of a light section 140, the light section 140 denoting a narrow, line-shaped, light-filled region. In this case, the optical deflection element 136 can alter the direction of the light beam, in particular by an angle of 75° to 105°, by 90° as illustrated in FIG. 1, wherein the aperture angle can also be increased to angle of 10° to 30°, typically 15° to 20°, at the same time. The optical deflection element 136 can typically be selected from a mirror, a prism, a beam splitter, an optical grating, or an optical component which can have a plurality of reflecting optical elements. The optical deflection element 136 comprises a prism 142 in the present exemplary embodiment.

According to the present disclosure, the optical unit 124 comprises a rotatable bearing 144 in relation to the spectacle frame 116 and, when used as intended, i.e., for the purposes of optical measurement of the inner contour 112 of the spectacle frame 116, is able to be inserted into the inner contour 112 of the spectacle frame 116. To this end, the apparatus 110 can comprise a rotation device (not illustrated here) which can be configured to rotate the entire optical unit 124. In this way, the light section 140 can be successively moved over the receptacle 122 of the spectacle frame rim 120 to be measured by way of a movement of the optical unit 124, as a result of which it is possible to illuminate a respective further section 138 of the inner contour 112 with the same light section 140 successively in time in order thus to be able to optically measure further parts of the shape of the inner contour 112, in particular over the entire spectacle frame rim 120. The section 138 of the inner contour 112 impinged by the light section can in this case comprise a set part of the inner contour 112, in particular a set angular range, typically ranging from 0.1° to 10°, particularly typically from 0.25° to 2.5°, in particular from 0.5° to 2°, of the inner contour of the spectacle frame 116.

The spectacle frame 116 to be measured can be received by a holding device (not illustrated here), wherein the holding device can typically be matched to the shape of the relevant spectacle frame 116. In this case, the spectacle frame 116 can be able to be fastened to the holding device in detachable fashion, typically by mechanical latching, magnetic fastening, or a detachable adhesive bond; other types of fastening are also possible, however.

As a consequence of the illumination by the light section 140, the respective section 138 of the inner contour 112 reflects some of the laser light impinging thereon. The objective 128, which has an optical axis 146, can generate an individual image of the illuminated section 138 of the inner contour 112 on the optical sensor 130. A preferred exemplary embodiment of the objective 128 is found below in FIG. 3. The optical sensor 130 represents an optical detector unit which, depending on an impingement of an optically sensitive sensor area of the optical sensor 130 with the laser light, is able to generate an electrical variable, in particular a voltage or an electric current, as a measurement value, which can serve as an input variable for further processing in an algorithm. The optical sensor 130 can typically be provided in the form of a sensor matrix, which comprises a plurality of individually readable sensor pixels. In a particularly preferred exemplary embodiment, the optical sensor 130 can have a small diameter ranging from 5 mm to 25 mm, in particular from only 10 mm to 20 mm. The optical sensor 130 can typically comprise a CCD sensor matrix; other types of optical sensors 130 are also possible, however.

Typically, the light source 126, the section 138 of the inner contour 112 that is able to be illuminated, the objective 128, and the optical sensor 130 are arranged relative to one another in a certain way. As illustrated schematically in FIG. 1, the light section 140 that is able to be generated by the light source 126 is able to be placed into an object-side plane of focus 148 while the optical sensor 130 can be able to be arranged in an image-side plane of focus 150, wherein the planes of focus may be arranged neither parallel to one another nor parallel to an objective plane 152, wherein the objective plane 152 can be perpendicular to the optical axis 146 of the objective 128. Rather, an angle $\theta$ between the object-side plane of focus 148 and the objective plane 152 can be adjustable to a value ranging from 60° to 85°, approximately 70° in this case, and an angle $\varphi$ between the objective plane 152 and the image-site plane of focus 150 can be adjustable to a value ranging from 15° to 75°, approximately 40° here. Hence, an angle $\psi$ between the object-side plane of focus 148 and the optical axis 146 of the objective 128 can assume a value ranging from 5° to 30°, approximately 20° in this case. As furthermore emerges from FIG. 1, the object-side plane of focus 140, the objective plane 152 and the image-side plane of focus 150 can intersect in a common straight line, of which the illustration of FIG. 1 shows exactly one point 154.

In the particularly preferred exemplary embodiment as per FIG. 1, the apparatus 110 can furthermore comprise a device 156 for data reduction and a device 158 for optical data transfer (transceiver). In this case, the device 156 for data reduction can typically comprise an FPGA (field-programmable gate array), which is configured to reduce a scale of measurement data generated by the optical sensor 130. By way of example, this can reduce a scale of the sensor data from approximately 250 MBaud to a number of approximately 1 MBaud in order thus to facilitate a data transfer by the device 158 for optical data transfer. The device 156 for data reduction, the device 158 for optical data transfer, and the optical sensor 130 can be configured as a common device in this case. The device 158 for optical data transfer can be configured to transmit the measurement data, in particular after the data reduction has been implemented, to an evaluation unit 160. To this end, two opposing light-emitting diodes 162 (LEDs) can typically serve as optical transmitter and optical receiver, wherein the data can typically be transferred using a half-duplex method. Other types of devices or methods for data transfer are conceivable, however.

In principle, the apparatus 110 can have an autonomous configuration in respect of its energy supply and, in particular, comprise an energy storage unit, typically a battery, to this end. However, a device 164 for supplying energy to the apparatus 110 can continue to be provided in the particularly preferred exemplary embodiment as per FIG. 1. In this case, the device 164 for supplying energy can comprise, firstly, fixed components 166 and, secondly, rotatable components 168, and can typically be embodied in the form of a split transformer 170. Other exemplary embodiments are possible, however.

Figure 2:
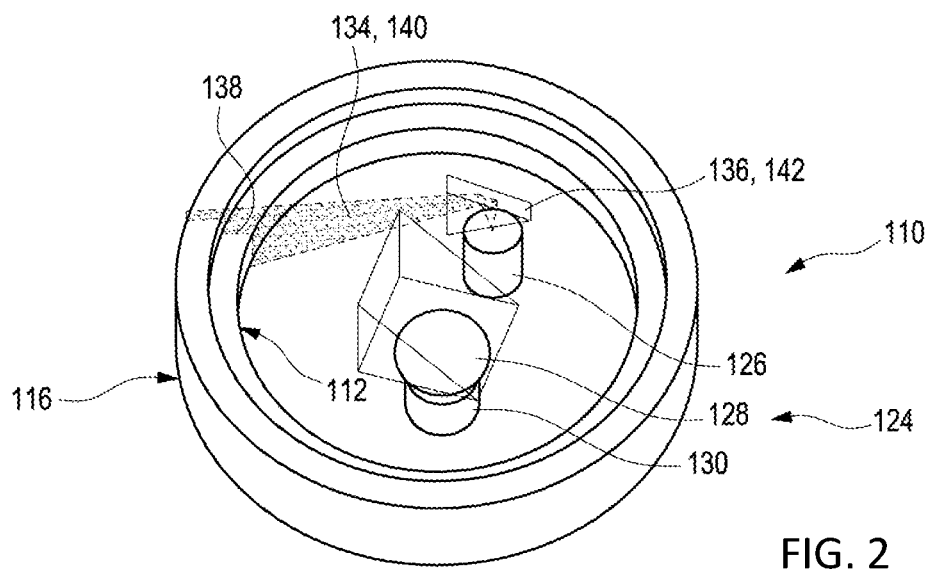
FIG. 2 shows a schematic illustration of a preferred exemplary embodiment of an optical unit from the apparatus for optical measurement of an inner contour of a spectacle frame, in a plan view.
Figure 3:
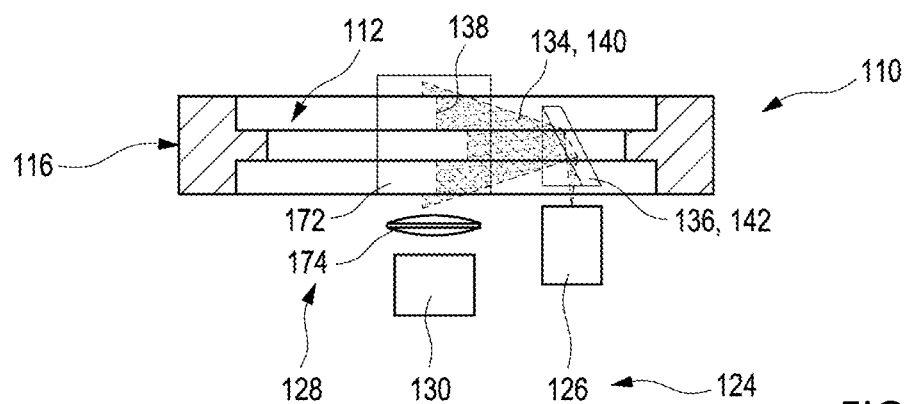
FIG. 3 shows a section through the preferred exemplary embodiment of the optical unit of FIG. 2.

FIG. 2 shows a schematic illustration of a preferred exemplary embodiment of the optical unit 124 in a plan view while FIG. 3 shows a section through the same preferred exemplary embodiment of the optical unit 124. In this case, the objective 128 comprises a deflecting element in the form of a further prism 172 and a focusing element in the form of a lens 174. In respect of further details, reference is made to the description of the optical unit 124 in relation to FIG. 1.

Figure 4:
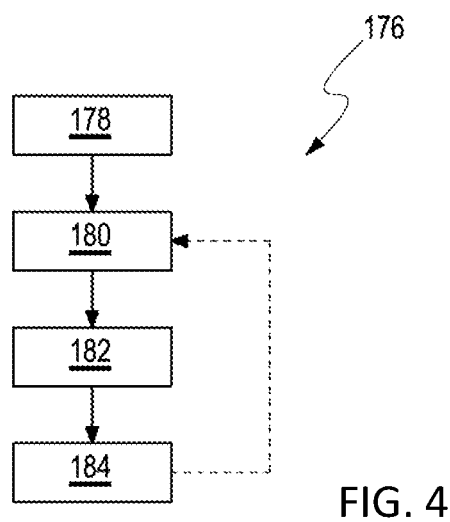
FIG. 4 shows a flowchart of a preferred exemplary embodiment of a method for optical measurement of an inner contour of a spectacle frame.

FIG. 4 shows a flowchart of a preferred exemplary embodiment of a method 176 for optical measurement of a component 112 of a pair of spectacles 114. In this case, as per step a), there is a provision of the spectacle frame 116 in a provision step 178. In an illumination step 180 as per step b), at least the envisaged section 138 of the inner contour 112 of the spectacle frame 116 is illuminated, typically by means of the light section 140 generated by the light source 126. In an imaging step 182, as per step c), imaging of the illuminated section 138 of the inner contour 112 onto the optical sensor 130 takes place, typically by means of the objective 128. In a measurement step 184, at least one property of the light reflected by the illuminated section 138 of the inner contour 112 is captured by way of a measurement, typically by means of the optical sensor 130, as per step d). To measure an entire inner contour or outer contour of the component 112 of the pair of spectacles 114, the illumination step 180 as per step b) can be carried out again, wherein a further section 138 of the inner contour 112 is illuminated by means of the light section 140 generated by the light source 126. According to the disclosure, this is implemented by rotating the rotatable bearing 144 of the optical unit 124. Reference is made to the above description of FIG. 1 in respect of further details and alternatives.

Figure 5:
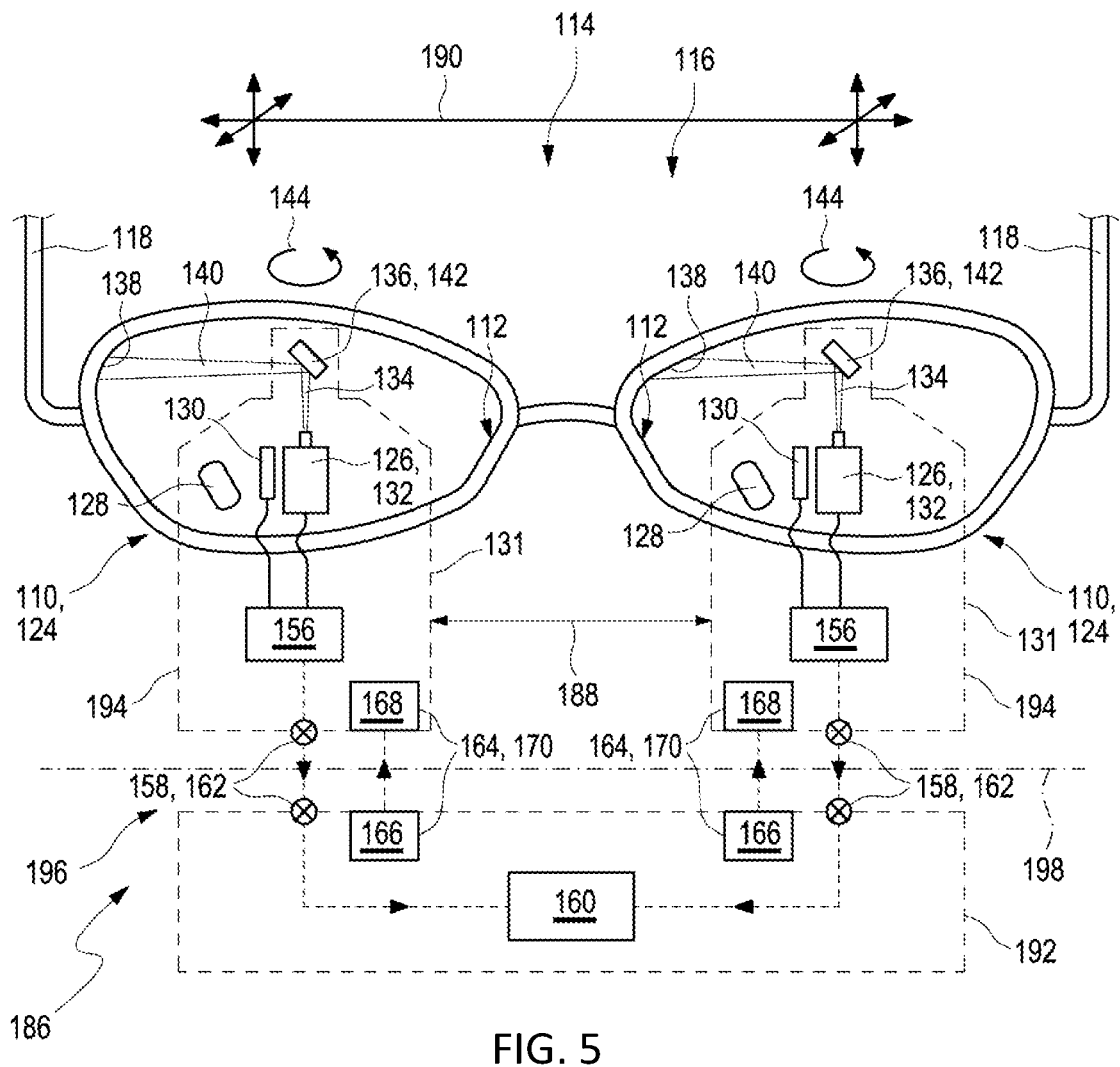
FIG. 5 shows a schematic illustration of an exemplary embodiment of a system for optical measurement of a pair of spectacles.

FIG. 5 shows a schematic illustration of an exemplary embodiment of a system 186 for optical measurement of a pair of spectacles 114. As emerges from FIG. 5, the exemplary system 186 illustrated here comprises exactly two of the apparatuses 110, each for optical measurement of one of the respective inner contours 112 of the spectacle frame 116, with each apparatus comprising the optical unit 124 provided with a rotatable bearing 144, the latter in each case being able to be inserted in one of the two receptacles of the spectacle frame 116, wherein the system 186 further comprises the evaluation unit 160, which carries out the respective evaluation of the data captured by the two apparatuses 110. In this preferred exemplary embodiment, the exactly two apparatuses 110 are arranged with a changeable distance 188 from one another. In this case, the evaluation unit 160 is configured, in particular, to determine a spatial assignment 190 of the two spectacle lenses.

Alternatively, the system 186 can also have only exactly one of the apparatuses 110 for optical measurement of one of the respective inner contours 112 of the spectacle frame 116 (not illustrated here), wherein the apparatus 110 comprises the optical unit 124 comprising a rotatable bearing 144, wherein the exactly one system 186 is able to be inserted initially into a first receptacle of the spectacle frame 116 and, following this, into a second receptacle of the spectacle frame 116, wherein the distance 188 is also able to be changed in this case in order to facilitate the measurement of the two inner contours 112 of the spectacle frame 116. Here, too, the evaluation unit 160 can undertake the determination of a spatial assignment 190 of the two spectacle lenses on account of the known movement of the exactly one apparatus 110 from the first receptacle to the second receptacle of the spectacle frame 116.

As furthermore shown in FIG. 5, the evaluation unit 160 is embodied as a separate device in relation to the apparatus 110 and, in particular, the optical unit 124 comprised thereby and, in particular, it is arranged in stationary fashion vis-à-vis the rotatably mounted optical unit 124. The system 186 can consequently comprise a stationary primary arrangement 192 and a rotatable secondary arrangement 194, wherein the primary arrangement 192 can comprise at least the evaluation unit 160 and the secondary arrangement can comprise at least the optical unit 124. In this case, the primary arrangement 192 and the secondary arrangement 194 can be rotatably connected to one another, in particular in a connection configured as a bearing 196, as a result of which it is possible to set a bearing plane 198. In this case, both the device for supplying energy to the optical unit and the device for energy transfer can be arranged in relation to the bearing plane 198.

For further details in relation to the illustration in FIG. 5, reference is made to the description above relating to FIG. 1.

Figure 6:
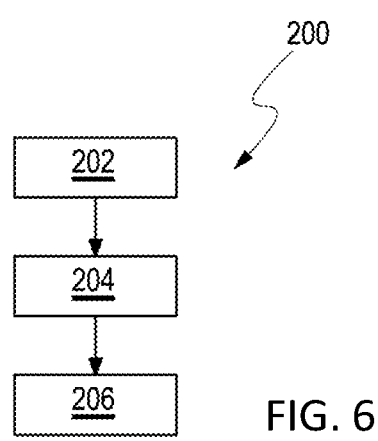
FIG. 6 shows a flowchart of a preferred exemplary embodiment of a method for producing a pair of spectacles.

FIG. 6 shows a flowchart of a preferred exemplary embodiment of a method 200 for producing a pair of spectacles 114. In a provision step 202 as per step (i), two spectacle lenses and a spectacle frame 116 are provided here, wherein the spectacle frame has two receptacles 122 for the spectacle lenses. In a measurement step 204, there is, following this and as per step (ii), a simultaneous optical measurement or immediately successive optical measurements of the two receptacles 122 as per the method 176 for optical measurement of a component 112 of a pair of spectacles 114. Finally, the two spectacle lenses and the spectacle frame 116 are joined in a joining step 206 as per step (iii). This method 200 for producing a pair of spectacles 114 facilitates, in particular, the ability to set a spatial assignment of the two spectacle lenses from the simultaneous optical measurement or the immediately successive optical measurements of the two receptacles 122.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Apparatus
112 Inner contour
114 Pair of spectacles
116 Spectacle frame
118 Temple
120 Spectacle frame rim
122 Receptacle
124 Optical unit
126 Light source
128 Lens
130 Optical sensor
131 Housing
132 Laser
134 Light beam
136 Optical deflection element
138 Section of the component (that is able to be illuminated)
140 Light section
142 Prism
144 Rotatable bearing
146 Optical axis of the objective 148 Object-side plane of focus
150 Image-side plane of focus
152 Objective plane
154 Point of the common straight line
156 Device for reducing data
158 Device for optical data transfer
160 Evaluation unit
162 Light-emitting diode
164 Device for supplying energy
166 Stationary components
168 Rotatable components
170 Split transformer
172 Prism
174 Lens
176 Method for optical measurement of a component of a pair of spectacles
178 Provision step
180 Illumination step
182 Imaging step
184 Measurement step
186 System for optical measurement of a pair of spectacles
188 Alterable distance
190 Spatial assignment of two spectacle lenses
192 Primary arrangement
194 Secondary arrangement
196 Bearing
198 Bearing plane
200 Method for producing a pair of spectacles
202 Provision step
204 Measurement step
206 Joining step

The invention claimed is:

1. An apparatus for an optical measurement of an inner contour of a spectacle frame, the apparatus comprising:
an optical unit configured to capture light reflected from an illuminated section of the inner contour of the spectacle frame, wherein the optical unit includes:
at least one light source;
an objective; and
at least one optical sensor,
wherein the light source is configured to generate a light section,
wherein at least one section of the inner contour is illuminable by the light section,
wherein the objective is configured to image the illuminated section of the inner contour onto the optical sensor,
wherein the optical sensor is configured to capture the light reflected by the illuminated section of the inner contour,
wherein the optical unit is insertable into the inner contour of the spectacle frame and, when inserted into the inner contour of the spectacle frame as intended, is mounted so as to be rotatable relative to the spectacle frame,
wherein the light source, the illuminable section of the inner contour, the objective, and the optical sensor are arranged relative to one another such that the section of the inner contour that is illuminable by the light section is placeable into an object-side plane of focus and the optical sensor is arrangeable in an image-side plane of focus, and
wherein the object-side plane of focus, an objective plane, and the image-side plane of focus intersect in a common straight line.

2. The apparatus according to claim 1, wherein the optical unit is rotatable by an angle such that at least two separate sections of the inner contour are illuminable by the light section, and wherein the optical sensor is configured to capture an image of the respective illuminated section of the inner contour.

3. The apparatus according to claim 2, wherein the optical sensor is configured to capture a respective image of 30 to 1500 illuminated sections of the inner contour.

4. The apparatus according to claim 2, wherein the optical unit further comprises a device for determining a value for the angle.

5. The apparatus according to claim 2, wherein the optical unit further comprises a device for determining a value for the angle by which the optical unit is rotatable.

6. The apparatus according to claim 1, wherein the optical unit is further configured to capture measurement data, wherein the captured measurement data are based on the capture of the light reflected by the illuminated section of the inner contour of the spectacle frame.

7. The apparatus according to claim 6, wherein the optical unit further comprises a device for data reduction, wherein the device for data reduction is configured to reduce a scale of the captured measurement data.

8. The apparatus according to claim 7, wherein the device for data reduction has a gain control, wherein the gain control is configured to compensate for brightness variations in the reflected light which have an effect on the captured measurement data.

9. The apparatus according to claim 6, wherein the optical unit further comprises a device for optical data transfer, and wherein the device for optical data transfer is configured to transmit the measurement data captured by the optical unit to an evaluation unit.

10. An apparatus for an optical measurement of an inner contour of a spectacle frame, the apparatus comprising:
an optical unit configured to capture light reflected from an illuminated section of the inner contour of the spectacle frame, wherein the optical unit includes:
at least one light source;
an objective; and
at least one optical sensor,
wherein the light source is configured to generate a light section,
wherein at least one section of the inner contour is illuminable by the light section,
wherein the objective is configured to image the illuminated section of the inner contour onto the optical sensor,
wherein the optical sensor is configured to capture the light reflected by the illuminated section of the inner contour,
wherein the optical unit is insertable into the inner contour of the spectacle frame such that the optical unit is movable in such a way that it at least contacts an imaginary plane, which is creatable from at least three points on the inner contour of the spectacle frame, during the optical measurement of the inner contour of the spectacle frame, and upon insertion into the inner contour of the spectacle frame to optically measure the inner contour of the spectacle frame is mounted so as to be rotatable relative to the spectacle frame,
wherein the light source, the illuminable section of the inner contour, the objective, and the optical sensor are arranged relative to one another such that the section of the inner contour that is illuminable by the light section is placeable into an object-side plane of focus and that the optical sensor is arrangeable in an image-side plane of focus, and wherein the object-side plane of focus, an objective plane, and the image-side plane of focus intersect in a common straight line.

11. An apparatus for an optical measurement of an inner contour of a spectacle frame, the apparatus comprising:
   an optical unit configured to capture light reflected from an illuminated section of the inner contour of the spectacle frame,
   wherein the optical unit is insertable into the inner contour of the spectacle frame and, when inserted into the inner contour of the spectacle frame as intended, is mounted so as to be rotatable relative to the spectacle frame,
   wherein the optical unit includes:
      at least one light source;
      an objective; and
      at least one optical sensor,
   wherein the light source is configured to generate a light section,
   wherein at least one section of the inner contour is illuminable by the light section, wherein the objective is configured to image the illuminated section of the inner contour onto the optical sensor,
   wherein the optical sensor is configured to capture the light reflected by the illuminated section of the inner contour,
   wherein the light source, the illuminable section of the inner contour, the objective, and the optical sensor are arranged relative to one another such that the section of the inner contour that is illuminable by the light section is placeable into an object-side plane of focus and that the optical sensor is arrangeable in an image-side plane of focus,
   wherein the object-side plane of focus, an objective plane, and the image-side plane of focus intersect in a common straight line,
   wherein the optical unit further includes:
      at least one optical deflection element, and
         wherein the optical deflection element is configured to direct the light section generated by the light source onto the section of the inner contour to be illuminated.

12. The apparatus according to claim 11, wherein the optical deflection element is selected from a mirror, a prism, a beam splitter, an optical grating, or an optical component which has a plurality of reflecting optical elements.

13. The apparatus according to claim 11, wherein the optical deflection element has a movable configuration such that at least two separate sections of the inner contour are illuminable by the light section.

14. The apparatus according to claim 11, wherein the optical unit is further configured to capture measurement data, and wherein the captured measurement data are based on the capture of the light reflected by the illuminated section of the inner contour of the spectacle frame.

15. The apparatus according to claim 10, wherein the optical unit further comprises a device for data reduction, and wherein the device for data reduction is configured to reduce a scale of the captured measurement data.

16. The apparatus according to claim 15, wherein the device for data reduction has a gain control, and wherein the gain control is configured to compensate for brightness variations in the reflected light which have an effect on the captured measurement data.

17. The apparatus according to claim 14, wherein the optical unit further comprises a device for optical data transfer, and wherein the device for optical data transfer is configured to transmit the measurement data captured by the optical unit to an evaluation unit.

18. A method for optical measurement of an inner contour of a spectacle frame, the method comprising:
   providing a spectacle frame and an apparatus for the optical measurement of an inner contour of the spectacle frame, wherein the apparatus for the optical measurement includes an optical unit configured to capture light reflected by an illuminated section of the inner contour of the spectacle frame;
   illuminating at least one section of the inner contour of the spectacle frame;
   imaging the illuminated section of the inner contour; and
   capturing light reflected by the illuminated section of the inner contour,
   wherein the optical unit includes:
      at least one light source;
      an objective; and
      at least one optical sensor,
   wherein the at least one section of the inner contour of the spectacle frame is illuminated by a light section generated by the light source,
   wherein the illuminated section of the inner contour is imaged onto the optical sensor by the objective,
   wherein the light reflected by the illuminated section of the inner contour is captured by the optical sensor,
   wherein the optical unit is inserted into the inner contour of the spectacle frame and is rotated relative to the spectacle frame,
   wherein the light source, the illuminated section of the inner contour, the objective, and the optical sensor are arranged relative to one another in such a way that the section of the inner contour illuminated by the light section is placed into an object-side plane of focus and the optical sensor is arranged in an image-side plane of focus, and
   wherein the object-side plane of focus, an objective plane, and the image-side plane of focus intersect in a common straight line.

19. A method for an optical measurement of an inner contour of a spectacle frame, the method comprising:
   providing a spectacle frame and an apparatus for optical measurement of an inner contour of the spectacle frame, wherein the apparatus includes:
      an optical unit configured to capture light reflected by an illuminated section of the inner contour of the spectacle frame;
   illuminating at least one section of the inner contour of the spectacle frame;
   imaging the illuminated section of the inner contour; and
   capturing light reflected by the illuminated section of the inner contour,
   wherein the optical unit includes:
      at least one light source;
      an objective; and
      at least one optical sensor,
   wherein the at least one section of the inner contour of the spectacle frame is illuminated by a light section generated by the light source,
   wherein the illuminated section of the inner contour is imaged onto the optical sensor by the objective,
   wherein the light reflected by the illuminated section of the inner contour is captured by the optical sensor,
   wherein the optical unit is inserted into the inner contour of the spectacle frame such that the optical unit at least contacts an imaginary plane during the optical measurement of the inner contour of the spectacle frame, the imaginary plane being created from at least three points on the inner contour of the spectacle frame, and upon insertion into the inner contour of the spectacle frame to optically measure the inner contour of the spectacle frame is rotated relative to the spectacle frame, wherein the light source, the illuminated section of the inner contour, the objective, and the optical sensor are arranged relative to one another such that the section of the inner contour that is illuminated by the light section is placed into an object-side plane of focus and the optical sensor is arranged in an image-side plane of focus, and wherein the object-side plane of focus, an objective plane, and the image-side plane of focus intersect in a common straight line.

20. A method for an optical measurement of an inner contour of a spectacle frame, the method comprising:
  providing a spectacle frame and an apparatus for the optical measurement of the inner contour of the spectacle frame,
  wherein the apparatus includes an optical unit configured to capture light reflected by an illuminated section of the inner contour of the spectacle frame;
  illuminating at least one section of the inner contour of the spectacle frame;
  imaging the illuminated section of the inner contour; and
  capturing light reflected by the illuminated section of the inner contour,
  wherein the optical unit is inserted into the inner contour of the spectacle frame and is rotated relative to the spectacle frame,
  wherein the optical unit includes:
  at least one light source;
  an objective; and
  at least one optical sensor,
  wherein the at least one section of the inner contour of the spectacle frame is illuminated by a light section generated by the light source,
  wherein the illuminated section of the inner contour is imaged onto the optical sensor by the objective, and the light reflected by the illuminated section of the inner contour is captured by the optical sensor,
  wherein the light source, the illuminated section of the inner contour, the objective, and the optical sensor are arranged relative to one another such that the section of the inner contour that is illuminated by the light section is placed in an object-side plane of focus and the optical sensor is arranged in an image-side plane of focus,
  wherein the object-side plane of focus, an objective plane, and the image-side plane of focus intersect in a common straight line,
  wherein the optical unit further includes at least one optical deflection element, and
  wherein the optical deflection element directs the light section generated by the light source onto the section of the inner contour to be illuminated.

21. A system for an optical measurement of a pair of spectacles, the system comprising:
  at least one apparatus for optical measurement of a respective inner contour of a spectacle frame according to claim 1; and
  an evaluation unit,
  wherein the evaluation unit is configured to determine a spatial assignment between the two spectacle lenses in the spectacle frame.

22. The system according to claim 21, wherein the system comprises exactly two apparatuses for the optical measurement, and wherein the exactly two apparatuses are arranged with an alterable distance from one another.

23. The system according to claim 22, wherein the distance between the two apparatuses is adjustable in relation to a specifiable distance for the spectacle lenses.

24. A method for producing a pair of spectacles, the method comprising:
  providing two spectacle lenses; an
  optically measuring the spectacle frame, which has two separate receptacles for the two spectacle lenses, the optically measuring including:
    providing the spectacle frame and the apparatus for the optical measurement of an inner contour of the spectacle frame according to claim 1, the apparatus including the optical unit,
      wherein the optical unit is configured to capture light reflected by an illuminated section of the inner contour of the spectacle frame;
    illuminating at least one section of the inner contour of the spectacle frame;
    imaging the illuminated section of the inner contour;
    capturing light reflected by the illuminated section of the inner contour; and
    assembling the two spectacle lenses and the spectacle frame,
  wherein the optical unit is inserted into the inner contour of the spectacle frame and rotated relative to the spectacle frame, and
  wherein a spatial assignment of the two spectacle lenses in the spectacle frame is ascertained.

25. The method according to claim 24, wherein the spatial assignment of the two spectacle lenses in the spectacle frame is ascertained by determining at least one of a distance between the two spectacle lenses, a displacement of the two spectacle lenses in relation to an optical axis of the pair of spectacles, and an inclination of the two spectacle lenses with respect to one another.

* * * * *

UNITED STATES PATENT AND TRADEMARK OFFICE
CERTIFICATE OF CORRECTION

PATENT NO. : 11,243,139 B2
APPLICATION NO. : 17/336775
DATED : February 8, 2022
INVENTOR(S) : Meschenmoser et al.

It is certified that error appears in the above-identified patent and that said Letters Patent is hereby corrected as shown below:

In the Claims
Column 27, Line 56, Claim 15, change "The apparatus according to claim 10" to -- The apparatus according to claim 14 --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*